(12) United States Patent
Kraus

(10) Patent No.: US 6,983,559 B1
(45) Date of Patent: Jan. 10, 2006

(54) FISH JAW GRIPPER TO FACILITATE HOOK REMOVAL

(76) Inventor: David J. Kraus, 41 W. 897 McDonald Rd., Elgin, IL (US) 60123

(*) Notice: Subject to any disclaimer, the term of this patent is extended or adjusted under 35 U.S.C. 154(b) by 0 days.

(21) Appl. No.: 10/774,133

(22) Filed: Feb. 6, 2004

(51) Int. Cl.
*A01K 97/00* (2006.01)

(52) U.S. Cl. .................. 43/4; 81/424; 81/418; 43/53.5
(58) Field of Classification Search .................. 43/4, 43/53.5; 81/386, 387, 418, 421, 424; 269/258
See application file for complete search history.

(56) References Cited

U.S. PATENT DOCUMENTS

| | | | | |
|---|---|---|---|---|
| 2,779,224 A | * | 1/1957 | Coggburn | 81/424 |
| 2,990,213 A | * | 6/1961 | Kolacinski | 81/424 |
| 3,263,535 A | * | 8/1966 | Zurcher | 81/424 |
| 4,070,745 A | * | 1/1978 | Schimmelman | 29/268 |
| 4,601,221 A | * | 7/1986 | Kalkbrenner et al. | 81/418 |
| 5,630,345 A | * | 5/1997 | Ciccotelli | 81/373 |
| 5,964,130 A | * | 10/1999 | Wang | 81/424 |
| 6,159,217 A | * | 12/2000 | Robie | 606/88 |
| 6,401,578 B1 | * | 6/2002 | Domenge | 81/424 |

* cited by examiner

*Primary Examiner*—Kurt Rowan
(74) *Attorney, Agent, or Firm*—John L. Schmitt

(57) ABSTRACT

A gripper to hold a fish upright during hook removal has a pliers-like body. This body includes a first member having an outer handle portion joined to an upper jaw portion and a second member having an inner handle portion joined to a lower jaw portion. The lower jaw portion is pivotally carried in an opening between sidewalls of the upper jaw portion. Bottom edges of outer segments of the upper jaw portion sidewalls have tooth-like abrasions. These abrasions mate with like abrasions on a top wall of a swivel element pivotally attached to the lower jaw portion. When the handle portions of the gripper are squeezed togther so that the jaw and swivel element abrasions compressively engage a lower jaw of a fish, downward movement of the swivel element is inhibited by a locking action between complementarily formed offsets on a bottom surface of the swivel element top wall and on the lower jaw portion.

8 Claims, 2 Drawing Sheets

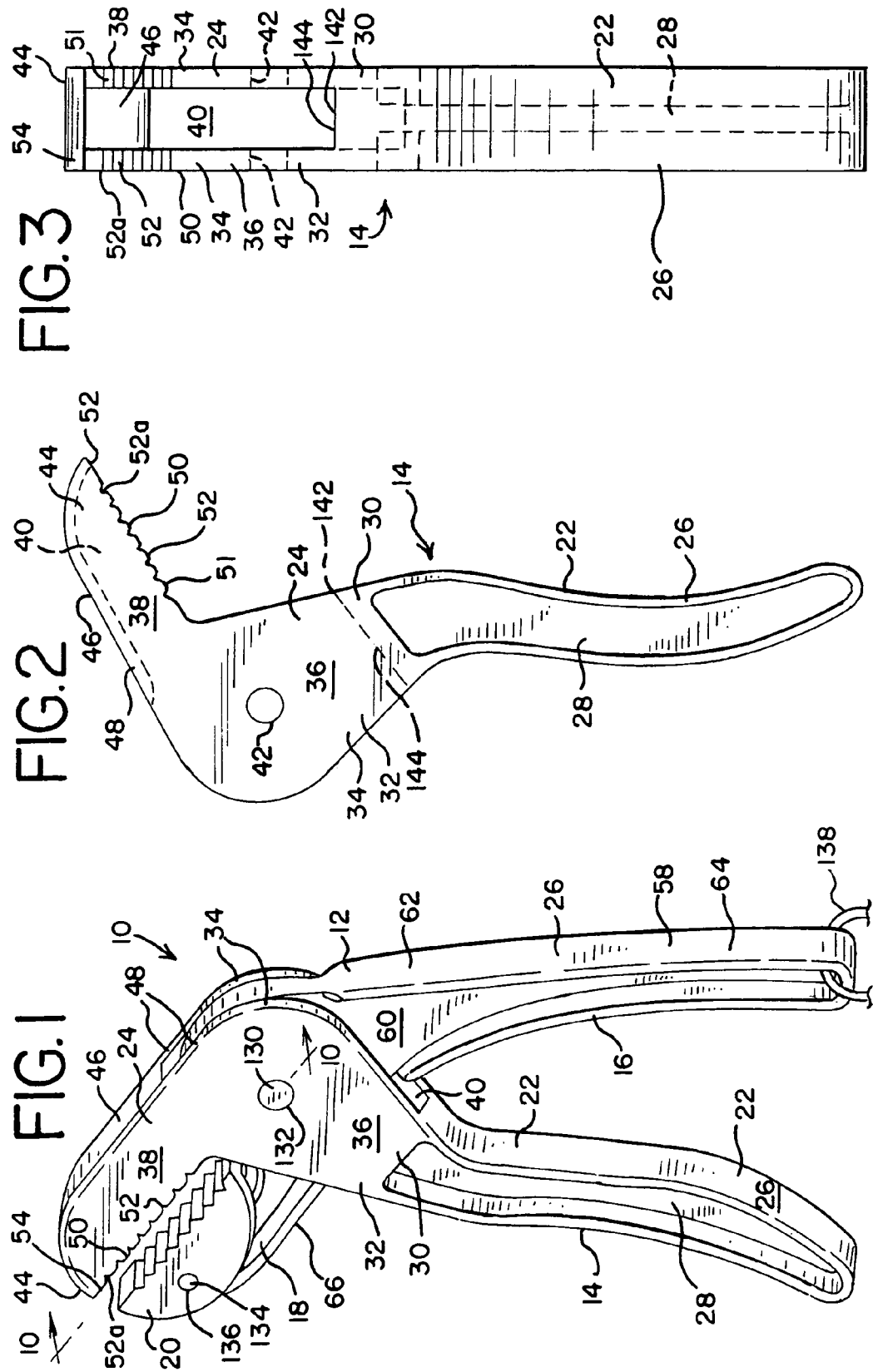

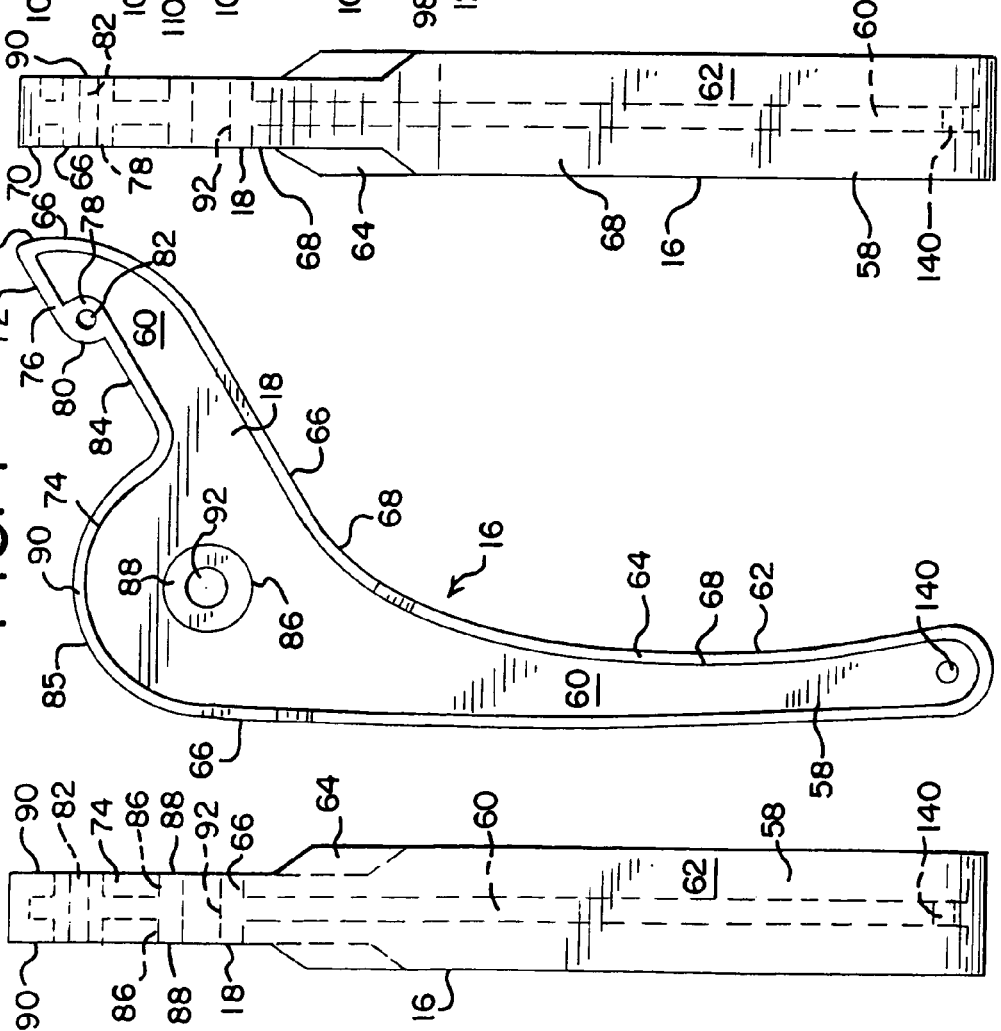

FISH JAW GRIPPER TO FACILITATE HOOK REMOVAL

BACKGROUND OF THE INVENTION

1. Field of the Invention

This invention relates to a pliers-like gripping device and more particularly to a gripper specifically adapted for a fisherman to hold a fish upright by its lower jaw using one hand so that the hook on which the fish was caught can be removed by the fisherman using his other hand.

2. Prior Art

Pliers, tongs, and other like devices for hand gripping have been known and in use for many years. Most all such devices include pivotally joined handle-jaw members having respective jaw portions adapted to compressively hold particular objects.

For example, U.S. Pat. No. 1,750,817 discloses a pair of tongs particularly adapted to hold an end of a piece of wire. These tongs include a pivotal gripping plate. This plate is pivotally carried by a pin disposed in an arcuate-shaped slot formed in an outer end of an upper jaw member of the tongs. A bottom edge of the plate is V-shaped to fit in a complimentary formed V-shaped groove formed in an outer end of the lower jaw. Assuming a wire end does not fully seat when placed in this groove, the bottom edge of the gripping plate rotates to adjust to this non aligned position of wire.

A second example of a gripping device adapted for a specific purpose is set out in U.S. Pat. No. 2,779,123. In this case, the gripping device is a fishhook extractor formed with a pair of elongated jaws members. An inner surface of each member includes a semicircular groove that mate to define a passageway to hold a shank portion of a fishhook. An inner end portion of this passageway then arched sideways to exit from a side of the extractor jaw members.

U.S. Pat. No. 2,842,997 presents an example of a pair of pliers adapted to compressively hold a head of a nail-like fastener. These pliers have jaws formed respectively with lateral and longitudinal intersecting grooves and recesses. When the jaws of the pliers mate, a cross-shaped space is formed to hold a head and connecting shank portion of the fastener.

A further pair of pliers having pivotal jaws that are particularly useful for gripping nuts or bolts is disclosed in U.S. Pat. No. 5,022,291. In this case, pivotally joined upper and lower arms of the pliers have respective spaced apart sidewalls defining inwardly facing concave-shaped seating spaces. On an inner edge of each sidewall is a protrusion formed with a rectangular-shaped slot. Disposed in each seating space is a jaw member where the jaw member is secured by a pivot pin having ends carried in the sidewall protrusion slots. Seemingly, the jaw members rotate to effect optimum seating against a nut or bolt compressively held by work engagement surfaces of the jaw members.

Different from the gripping devices discussed above, U.S. Pat. No. 5,964,130 discloses a pair of locking pliers having a fixed upper jaw member joined to an upper handle having spaced apart sidewalls. This upper jaw member is formed with an inward facing, shallow V-shaped, serrated engaging surface. A lower jaw member of the pliers includes a base portion pivotally carried between spaced part sidewalls of a lower handle and pivotally carried between the sidewalls of the upper handle. Pivotally attached to an outer end of the lower jaw member is an engaging member having spaced apart sidewalls defining a space for disposition of the lower jaw member outer end. An inner end of the engaging member is forced away from the lower jaw member outer end by a spring carried by in a recess in the lower jaw member outer end.

Still further gripping devices are set out in U.S. Pat. Nos. 5,822,915 and 5,921,016.

SUMMARY OF THE INVENTION

A gripper of this invention that is particularly adapted to hold a fish upright during hook removal has a pliers-like body. This body includes a first member having an outer handle portion joined to an upper jaw portion having an inverted L-like shape. Spaced apart sidewalls of the upper jaw portion extend upward and then outward with outer ends of these sidewalls being connected by a top wall.

Disposed in an open space between the sidewalls of the upper jaw portion is a second member having an inner handle portion joined to a lower jaw portion. The first and second members are connected by a pivot pin.

Bottom edges of outer ends of the upper jaw portion sidewalls have tooth-like abrasions that align with further tooth-like abrasions on a top surface of a top wall of a swivel element. This swivel element is loosely held by a pivot pin carried by the lower jaw portion. When the abrasive surfaces of the upper jaw portion and the swivel element align upon engagement, downward movement of the swivel element is inhibited by an interference fit between complementarily formed offsets in a bottom surface of the swivel top wall and in a peripheral flange extending about the lower jaw portion.

For use, the fisherman first inserts his non dominant hand through a loop-shaped strap attached to the inner handle portion of the gripper to prevent loss of the gripper were the gripper to dislodge from the fisherman's hand. Then, as a hooked fish is reeled in to a position where the fisherman can reach the fish, the fisherman opens the gripper jaw portions so that the upper jaw portion may be inserted into the fish mouth and the swivel element be positioned against an outer side of the fish's lower jaw. Next, the fisherman squeezes the gripper handle portions to compressive hold the fish by its lower jaw in an upright position. As now held, the fisherman may set aside his rod and reel and secure another tool with his now free other hand to disengage the hook. With the hook removed the fish may be released or placed on a stringer.

The gripper of this invention provides several advantages over previously known gripping devices. To appreciate these advantages some understanding of the complexities of sport fishing is required.

First, every effort should be made to minimize injury to a fish during hook removal. For example, merely holding a fish by its gills can produce life threatening injury to a fish's respiratory system. An injured fish may not survive when released; a severely injured fish most likely will not survive. Further, where a fish is stringered for later consumption, freshness is enhanced by minimizing an injury that could shorten the fish's life.

A second point for recognition is that securing a fish before and during hook removal is not an easy task. Hooked fish most often continue to struggle. Therefore, ideal placement of the gripper's jaws is not always possible, particularly where the gripper typically is held by the fisherman's non dominant hand. Also, hook removal is easier when the fish is securely held. Additionally, after initial placement any inadvertent reclasping of the gripper can result in loss of or injury to the fish. Lastly, during ice fishing the gripper typically is held by a gloved hand.

In spite of recognition the above noted obvious points, it would appear that theretofore there has been no gripping device particularly adapted for a fisherman to gain initial control of a fish and then securely hold that fish in an injury resistant manner as a fishing hook is being disengaged from the fish's digestive system. As discussed above, during the initial control phase of a hook removal procedure, the fisherman may have difficulty fully inserting the upper jaw portion of the gripper into the fish's mouth. If less than full insertion were to occur, the two spaced apart abrasive edges of the gripper upper jaw portion only do limited damage to the fish's lower jaw teeth when the gripper jaw portions are squeezed together. Also, these abrasive edges of the gripper upper jaw portion are spaced sufficiently apart and the swivel element is sufficiently wide to neutralize twisting action of a fish that continues to struggle.

Upon upper jaw portion insertion, the swivel element of the gripper is positioned outside and against the lower jaw of the fish. During gripper jaw compression, the swivel element produces only limited abrasion. Note first that the swivel element has a substantial contact area to absorb the compressive force of the gripper upper jaw located inside the fish's mouth. Additionally, distribution of this compressive force is promoted by the loose pivot connection between the lower jaw portion and the swivel element. This loose pivot connection optimizes the area of seating of the gripper swivel element against the fish's lower jaw. Lastly, once the swivel element is in place, downward vertical movement of the swivel element is inhibited by the interference fits between the lower jaw portion and swivel element offsets. This interference fit inhibits swivel element movement even if the compressive force on the gripper were inadvertently relaxed as may occur if the fisherman's non dominant hand tires or slips from being wet. While compressed, any swivel element movement could result in still further injury to the fish's jaw. Note further that because the handle portions of the gripper align, the gripper is equally useable by right or left-handed fishermen. With the fish securely held in an injury resistant manner by the gripper, hook removal may proceed in a manner that produces minimal injury to the fish.

DESCRIPTION OF THE DRAWING FIGURES

FIG. 1 is a perspective view a fish jaw gripper of this invention.

FIG. 2 is an elevation view of a side of a first member of the gripper of FIG. 1.

FIG. 3 is an elevation view of an end of the first member of FIG. 2.

FIG. 4 is an elevation view of a side of a second member of the gripper of FIG. 1.

FIG. 5 is an elevation view of one end of the second member of FIG. 4

FIG. 6 is an elevation view of an opposite end of the second member of FIG. 4.

FIG. 7 is an elevation view of a side of a swivel element of the gripper of FIG. 1

FIG. 8 is an elevation view of an end of the swivel element of the element of FIG. 7.

FIG. 9 is a plan view of the swivel element of FIG. 7.

FIG. 10 is a cross sectional view of a connection between a lower jaw portion of the second member and the swivel element of the gripper as seen generally along the line 10—10 in FIG. 1.

DESCRIPTION OF THE PREFERRED EMBODIMENT

A gripper of the invention is shown generally in FIG. 1 and designated 10. This gripper 10 is particularly adapted for use by a fisherman to hold a fish while the fisherman extracts a hook from the fish's mouth. The gripper 10 has a pliers-like body 12 comprising a first member 14 and a second member 16. Pivotally attached to a lower jaw portion 18 of the second member 16 is a swivel element 20.

As seen in FIGS. 2 and 3, the first member 14 includes an outer handle portion 22 connected to an upper jaw portion 24. The outer handle portion 22 is defined by a peripheral flange 26 that extends about a central web 28. The flange 26 and web 28 then extend upward and join to form an upper end 30. This upper end 30 of the outer handle portion 22 then integrally connects with a lower end 32 of the upper jaw portion 24.

The upper jaw portion 24 includes spaced apart sidewalls 34 having inverted L-like shapes. Each sidewall 34 is divided respectively into a lower leg segment 36 and a connecting upper leg segment 38. Between these sidewalls 34 is an open space 40. In the lower leg segments 36 of the sidewalls 34 is a set of aligned openings 42. Outer ends 44 of the sidewall upper leg segments 38 are radiused. A top wall 46 then connects top edges 48 and the radiused outer ends 44 of the sidewall upper leg segments 38. A bottom edge 50 of each sidewall upper leg segment 38 is formed with abrasions 51, for example a set of tooth serrations 52. A first outer serration 52a of each set of tooth serrations 52 is located inward from an outer lower edge 54 of the top wall 46. Note that the sidewall upper segment bottom edges 50 and the top wall 46 taper slightly outward.

As seen in FIGS. 4–6, the second member 16 also an inverted L-like shape and is defined by an inner handle portion 58 integrally connected with the lower jaw portion 18. Extending about a central web 60 of the inner handle portion 58 is a wide segment 62 of a peripheral flange 64. This wide segment 62 of the flange 64 then connects with a narrow flange segment 66 that extends about the web 60 of the lower jaw portion 18. Lower sections 68 of the handle and jaw portion flange segments 62, 66 are formed having an arcuate shape. An outer end 70 of the lower jaw peripheral flange narrow segment 66 is upturned and connects with a first flat part 72 of an upper section 74 of the lower jaw flange segment 66. An inner end 76 of the flange first flat part 72 then connects with a flange enlarged part 78 having, as shown, a reverse Z-like shape that defines an offset 80. Extending through the enlarged part 78 is an opening 82. A second flat part 84 of the flange upper section 74, located below the first flat part 72, then connects the flange enlarged part 78 to an upward extending flange radiused part 85. Inward from this flange radiused part 85 in the web 60 is a boss 86 that projects outward from each side of the web 60. End surfaces 88 of the boss 86 align with side edges 90 of the lower jaw portion peripheral flange narrow segment 66. The boss 86 then is formed with an opening 92.

The swivel element 20, shown in detail in FIGS. 7–9, has a shed-like body 96. This body 96 is defined by spaced apart sidewalls 98 having respective arcuate-shaped lower edges 100 and a set of aligned openings 102. The sidewalls 98 are connected by a top wall 104. An inner end 106 of the top wall 104 is offset from inner ends 108 of the sidewalls 98 to form a space 110. A top surface 112 of the swivel element top wall 104 is formed with abrasions 51, for example with further set of tooth serrations 114 like the tooth serrations 52. These teeth 114 connect with a flat outer end part 116. A bottom surface 118 of the swivel element top wall 104 includes a downward extending offset 120 having, as shown, a reverse Z-like shape. A flat outer part 124 of the top wall bottom surface 118 connects with an outer end of the offset 120 while an angularly positioned flat inner part 126 connects with an inner end of the offset 120.

For assembly, the lower jaw portion 18 of the gripper second member 16 is inserted through the open space 40 defined by the sidewalls 34 of the first member upper jaw portion 24. This open space 40 is sufficiently wide to accommodate the lower and upper sections 68, 74 of the lower jaw flange narrow segment 66. With the opening 92 in the lower jaw portion boss 86 aligned the openings 42 in the upper jaw portion sidewalls 34, a first pin 130 is pressed through these openings 42, 92. Ends of the pin 130 then are riveted to form a first pivot connection 132 between the gripper first and second members 14, 16. Note that as assembled, the handle portions 22, 58 align providing equal usability by the right or left hand of a fisherman.

Next, the swivel element 20 is attached to the lower jaw portion 18 by inserting a second pivot pin 134 through the openings 102 in the swivel element sidewalls 98 and the opening 82 in the lower jaw flange enlarged part 78. In this case, the space between the swivel element sidewalls 98 is sufficiently wide to accommodate the upper section 74 of the narrow segment 66 of the peripheral flange 64 of the second member 16. Note that the diameter of the lower jaw portion enlarged part opening 82 is somewhat greater that the diameter of the pin 134. When ends of this second pivot pin 134 are riveted flat, a loose pivot connection 136 is formed.

Before use of the gripper 10, it is recommended that a fisherman insert his hand (typically non dominant) through a strap 138 looped through a hole 140 in a lower end of the web 60 of the second member inner handle portion 58. Then, assuming the fisherman has a fish ready for hook removal, the fisherman opens the jaw portions 18, 24 of the gripper 10 by finger contact with the gripper handle portions 22, 58. Outward opening movement of the handle portions 22, 58 is limited by contact of the lower section 68 of the lower jaw portion peripheral flange narrow segment 66 with an inner edge 142 of a bottom wall 144 of the upper jaw portion open space 40. With the jaw portions 18, 24 open, the outer radiused ends 44 of the upper jaw portion 24 may be inserted into the fish's mouth.

As noted earlier, full cooperation by the fish for this insertion cannot always be expected. Therefore, when the jaw portions 18, 24 of the gripper 10 are brought together by the fisherman squeezing the gripper handle portions 22, 58, the two sets of upper jaw tooth serrations 52 may inadvertently strike the fish's lower jaw teeth. Because the upper jaw portion tooth serrations 52 are spaced apart, at worst only two of the fish's lower jaw teeth are crushed.

Also, as the jaw portions 18, 24 converge, the top wall 104 of the swivel element 20 may not be positioned parallel to the bottom edges 50 of the upper jaw portion sidewalls 34. Note that the rotational arc of the swivel element 20 is proximately 25 degrees. As seen in FIG. 10, clockwise rotation of the swivel element 20 is limited by contact between the flat outer part 124 of the swivel element top wall bottom surface 118 and the first flat part 72 of the lower jaw portion flange upper section 74.

Counterclockwise movement of the swivel element 20 is limited by contact between the flat inner part 126 of the swivel element top wall bottom surface 118 and the lower jaw portion flange second flat part 84. Where the swivel element 20 is rotated fully counterclockwise, a selective portion of the lower jaw flange second flat part 84 locates in the space 110 of the swivel element 20. As fully rotated counterclockwise, a front edge 146 of the swivel element 20 engages the bottom edges 50 of the upper jaw portion sidewalls 34 at a point in front of the upper jaw outer most tooth serration 52a. Thus, the swivel element 20 is free to swing, clockwise or counterclockwise, to a position where the swivel element tooth serrations 114 substantially align with an outside of the fish's lower jaw.

As the swivel element tooth serrations 114 engage the skin of the fish lower jaw, the loose pivot connection 136 between the swivel element 20 and the lower jaw portion 18 promotes full seating of the tooth serrations 114 against the fish's jaw skin. Full seating insures that the compressive forces applied by gripper tooth serrations 52, 114 are dispersed over the largest possible area and thereby lessens the probability of injury to the fish's lower jaw.

With the fish fully secured by the gripper 10, the fisherman now uses his non dominant hand hold the fish in an upright position so that the fish's mouth opens upward. As the gripper jaw portions 18, 24 are now vertically positioned, the swivel element offset 120 interlocks with the lower jaw portion offset 80, see FIG. 10. This interlocking is promoted by engagement of the swivel element flat outer part 124 with the lower jaw portion flange first flat part 72. As engaged, downward movement of the swivel element 20 is inhibited even if there were some relaxing of the fisherman's gripping force. Some relaxation must be expected from use of the fisherman's non dominant hand to hold the fish. Since downward swivel element movement is inhibited, minimal shear induced stresses are applied to the fish's jaw by the gripper's tooth serrations 52, 114.

While an embodiment, uses, and advantages of this invention have been shown and discussed, it should be understood that this invention is limited only by the scope of the claims. Those skilled in the art will appreciate that various modifications and changes may be made without departing from the scope and spirit of the invention, and these modifications and changes may result in further uses and advantages.

What is claimed is:

1. A gripper particularly adapted to hold a fish upright while a hook is being extracted from the fish's digestive system, said gripper comprising:

a first member having an outer handle portion connecting with an upper jaw portion with said upper jaw portion having an open space defined in part by spaced apart sidewalls having abrasive bottom edges, a second member having an inner handle portion connecting with a lower jaw portion with said lower jaw portion pivotally carried in said upper jaw portion open space, and a swivel element pivotally carried by said lower jaw portion, said swivel element formed with a top wall having an abrasive top surface and a bottom surface prepared to mate with said lower jaw portion, said upper jaw portion sidewalls being divided respectively into lower leg segments and offset upper leg segments with said upper leg segments having radiused outer ends and top edges connected by a top wall, and said upper jaw abrasive bottom edges including sets of tooth serrations with a first outermost tooth serration being inwardly offset from an outer bottom edge of said upper jaw portion top wall, and said lower jaw portion positioned next to a lower jaw of said fish and then said handle portions squeezed together so that said upper jaw portion abrasive bottom edges and said swivel element abrasive top surface engage said fish's lower jaw in a manner that minimizes injury to said fish and wherein upon said swivel element being rotated fully counterclockwise, a front edge of said swivel element remains free from forming an interference fit with said upper jaw tooth serrations upon contact between said swivel element front edge and said sidewall bottom edges of said upper jaw portion.

2. A gripper as defined by claim 1 and further characterized by,
said second member lower jaw portion formed with an offset, and
said swivel element top wall having a bottom surface formed with an offset prepared to mate with and form an interlocking fit with said lower jaw portion offset,
wherein said interlocking fit between said offsets inhibits independent movement of said swivel element upon engagement of said swivel element with said lower jaw of said fish.

3. A gripper as defined by claim 2 and further characterized by,
said first member handle portion and said second member defined in part by a peripheral flange extending about a central web.

4. A gripper as defined by claim 3 and further characterized by,
said peripheral flange extending about said web of said second member being divided into a wide segment positioned about said web of said inner handle portion and a narrow segment positioned about said web of said lower jaw portion, and
said flange narrow segment being divided into a lower section and an upper section, said upper section having a first part and a second part connected by an enlarged part with said first part being flat, said second part being angularly offset and positioned below said first part, and said enlarged part defining said lower jaw portion offset and having an opening to loosely carry a pivot pin forming in part said pivot connection between said lower jaw portion and said swivel element.

5. A gripper as defined by claim 3 and further characterized by,
said web of said lower jaw portion formed with a boss extending outward from said web with respective end surfaces of said boss aligning with edges of a narrow segment of said peripheral flange, and an opening through said boss carrying a pivot pin forming in part said first member-second member pivot connection.

6. A gripper as defined by claim 3 and further characterized by,
said web of said inner member handle portion having a hole, and
a loop-shaped strap carried in said hole.

7. A gripper as defined by claim 4 and further characterized by,
said swivel element having sidewalls fitting loosely over said upper section of said lower jaw portion flange with an inner end of said swivel element top wall being offset from inner ends of said swivel element sidewalls to form a space prepared to receive said second part of said lower jaw portion flange upper section upon counterclockwise rotation of said swivel element, and said swivel element top wall bottom surface having an outer flat part prepared to mate with said first part of said lower jaw flange upper section upon clockwise rotation of said swivel element.

8. A gripper for holding a fish upright by its lower jaw to facilitate removal of a fishhook from a mouth of said fish, said gripper comprising:
a first member having an outer handle portion integrally joined to an upper jaw portion with said upper jaw portion having sidewalls spaced apart to form an open space, and upper leg segments of said sidewalls having bottom edges formed with respective sets of tooth serrations,
a second member having a peripheral flange extending about a central web to define an inner handle portion integrally joined to a lower jaw portion, said peripheral flange having a wide segment extending about said inner handle portion and a narrow segment extending about said lower jaw portion, said flange narrow segment including an upper section having a first flat part and a second flat part connected by an enlarged part forming an offset that positions said flange second flat part below said flange first flat part, and said second member disposed in said upper jaw portion open space and pivotally joined to said first member by a pin carried by said upper jaw portion sidewalls and said second member lower jaw portion, and
a swivel element having a sled-like body comprising sidewalls connected by a top wall with an inner end of the top wall being offset from inner ends of the sidewalls to form a space, said top wall having a top surface formed with a set of tooth serrations and having a bottom surface formed with a flat outer part and an angularly positioned flat inner part connected by a Z-like shaped offset, said swivel element disposed on said lower jaw portion with said lower jaw portion positioned between said swivel element sidewalls and said swivel element being pivotally attached to said lower jaw portion by a pin extending through an opening in each said swivel element sidewalls and loosely through an opening in said lower jaw portion flange enlarged part,
wherein upon rotation of said swivel element to a position that aligns said swivel element tooth serrations with said upper jaw portion tooth serrations, said swivel element bottom surface flat outer part mates with said lower jaw portion flange first flat part and said swivel element bottom surface offset mates with said lower jaw portion flange offset to form an interlocking fit that inhibits relative downward movement of said swivel element when said sets of tooth serrations engage said fish's lower jaw so that a fisherman using said gripper to hold a fish upright may remove a hook from said fish's mouth.

* * * * *